United States Patent [19]
Blanchet et al.

[11] Patent Number: 6,062,020
[45] Date of Patent: *May 16, 2000

[54] EXHAUST MANIFOLD CONVERTER APPARATUS

[75] Inventors: Scott Christopher Blanchet, Imlay City; Russell Paul Richmond, Clifford; Gerald Leroy Vaneman, Grand Blanc, all of Mich.

[73] Assignee: General Motors Corporation, Detroit, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/968,722

[22] Filed: Nov. 12, 1997

[51] Int. Cl.[7] ....................................................... F01N 3/10
[52] U.S. Cl. ................................. 60/302; 60/323; 60/304
[58] Field of Search .............................. 60/302, 323, 304, 60/289

[56] References Cited

U.S. PATENT DOCUMENTS

| 3,124,930 | 3/1964 | Power ........................................ 60/302 |
| 3,694,325 | 9/1972 | Katz et al. . |
| 3,872,666 | 3/1975 | Bentley ...................................... 60/277 |
| 3,881,316 | 5/1975 | Bunda et al. ............................. 60/302 |
| 4,023,361 | 5/1977 | Kojima ...................................... 60/302 |
| 4,887,427 | 12/1989 | Shinzawa et al. ....................... 60/302 |
| 5,031,401 | 7/1991 | Hinderks .................................. 60/302 |
| 5,497,619 | 3/1996 | Yamada et al. . |
| 5,546,748 | 8/1996 | Iwai et al. . |
| 5,562,510 | 10/1996 | Suzuki et al. . |
| 5,648,050 | 7/1997 | Matsumoto et al. . |
| 5,692,373 | 12/1997 | Atmur et al. ............................. 60/323 |

FOREIGN PATENT DOCUMENTS

| 2453280 | 5/1976 | Germany ................................. 60/302 |
| 97/30797 | 8/1997 | WIPO . |
| 97/31738 | 9/1997 | WIPO . |
| 97/32119 | 9/1997 | WIPO . |

OTHER PUBLICATIONS

U.S. application No. 08/697,478, pending assigned to the assignee of this invention, the confidentiality of which is not waived.

*Primary Examiner*—Thomas Denion
*Assistant Examiner*—Binh Tran
*Attorney, Agent, or Firm*—Vincent A. Cichosz

[57] ABSTRACT

A manifold converter apparatus comprising a manifold housing including a plurality of inlets wherein each inlet of the plurality of inlets is mounted immediately adjacent an internal combustion engine exhaust port and a plurality of lead pipes wherein each lead pipe of the plurality of lead pipes provides an exhaust gas flow passage between one of the inlets and a manifold plenum and at least one catalyst coated substrate located within at least one of the inlets between at least one of the exhaust ports and one of the lead pipes. An advantage achieved includes quick light-off of the manifold converter apparatus after cold start of the vehicle engine.

11 Claims, 2 Drawing Sheets

EXHAUST MANIFOLD CONVERTER APPARATUS

This invention relates to an exhaust manifold converter apparatus.

BACKGROUND OF THE INVENTION

Porous cellular metallic structures are known and available to those skilled in the art. They may be produced by a variety of techniques. One technique produces substantially closed cell foam-like metal structures and involves placing a temperature decomposable gas forming solid into a molten metal. Upon decomposition of this solid, gas bubbles forming cause the molten metal to foam prior to and during cooling. Another techniques involves impregnating an open cell porous structure with a suspension of powdered metal, driving off the suspension medium and sintering the metal particles together. Yet, another techniques involve electroforming metal on a three dimensionally reticulated open cell substrate.

Catalytic converter devices are used in exhaust management systems to aid in the efficient conversion of undesirable gas species to more desirable exhaust gas species.

SUMMARY OF THE PRESENT INVENTION

It is an object of this invention to provide a manifold converter apparatus according to claim 1.

Advantageously, this invention provides a manifold converter apparatus that combines the catalytic converter function into an exhaust manifold of an internal combustion engine.

Advantageously, this invention provides a manifold converter apparatus that achieves rapid light off time of the catalytic converter function combined into the exhaust gas manifold of a vehicle's internal combustion engine.

Advantageously, this invention makes use of an open cell substrate within an exhaust gas manifold of an internal combustion engine to carry an exhaust gas catalyst of a known type suitable for converting undesirable species of exhaust gases into more desirable species.

Advantageously, this invention makes use of the open cell substrate structure to allow both conversion of the exhaust gas passing through the open cell structure and a combination of the exhaust gas with secondary air injected into the exhaust gas within the substrate.

Advantageously then, according to a preferred example, this invention provides a manifold converter apparatus comprising a manifold housing including a plurality of inlets wherein each inlet of the plurality of inlets is mounted immediately adjacent an internal combustion engine exhaust port and a plurality of lead pipes wherein each lead pipe of the plurality of lead pipes provides an exhaust gas flow passage between one of the inlets and a manifold plenum and at least one catalyst coated substrate located within at least one of the inlets between at least one of the exhaust ports and one of the lead pipes.

BRIEF DESCRIPTION OF THE DRAWINGS

The present invention will now be described by way of example with reference to the following figures in which.

DESCRIPTION OF THE PREFERRED EMBODIMENT

Figure 1:
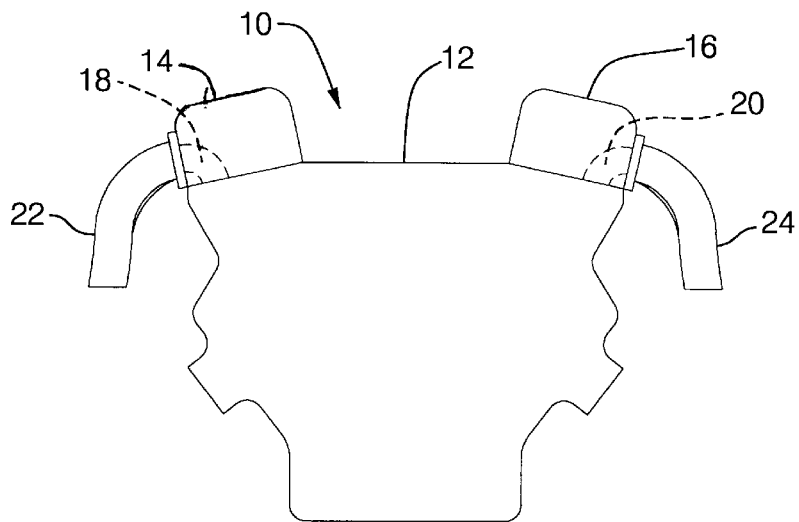
FIG. 1 illustrates schematically an engine assembly including an example manifold converter apparatus according to this invention.

Referring now to FIG. 1, the engine assembly 10 shown includes an engine block 12 and cylinder heads 14 and 16 mounted to the engine block 12 in a known manner. One skilled in the art will recognize the configuration of the engine block 12 as that of a V-type engine which typically includes six or more cylinders.

Within each of the cylinder heads 14 and 16, exhaust ports 18 and 20 carry exhaust gas from the engine cylinder to the exhaust manifolds 22 and 24 where the exhaust gas undergoes desirable reactions stimulated by one or more catalysts of a known type. Manifold converter apparatus 22 combines the exhaust gas flow from separate exhaust ports 18 (only one shown) into a single flow passage from which the exhaust gas exits at the down-stream end of the manifold converter apparatus 22. Manifold converter apparatus 24 combines the exhaust gas flow from separate exhaust ports 20 (only one shown) into a single flow passage from which the exhaust gas exits at the down-stream end of the manifold converter apparatus 24.

Figure 2:
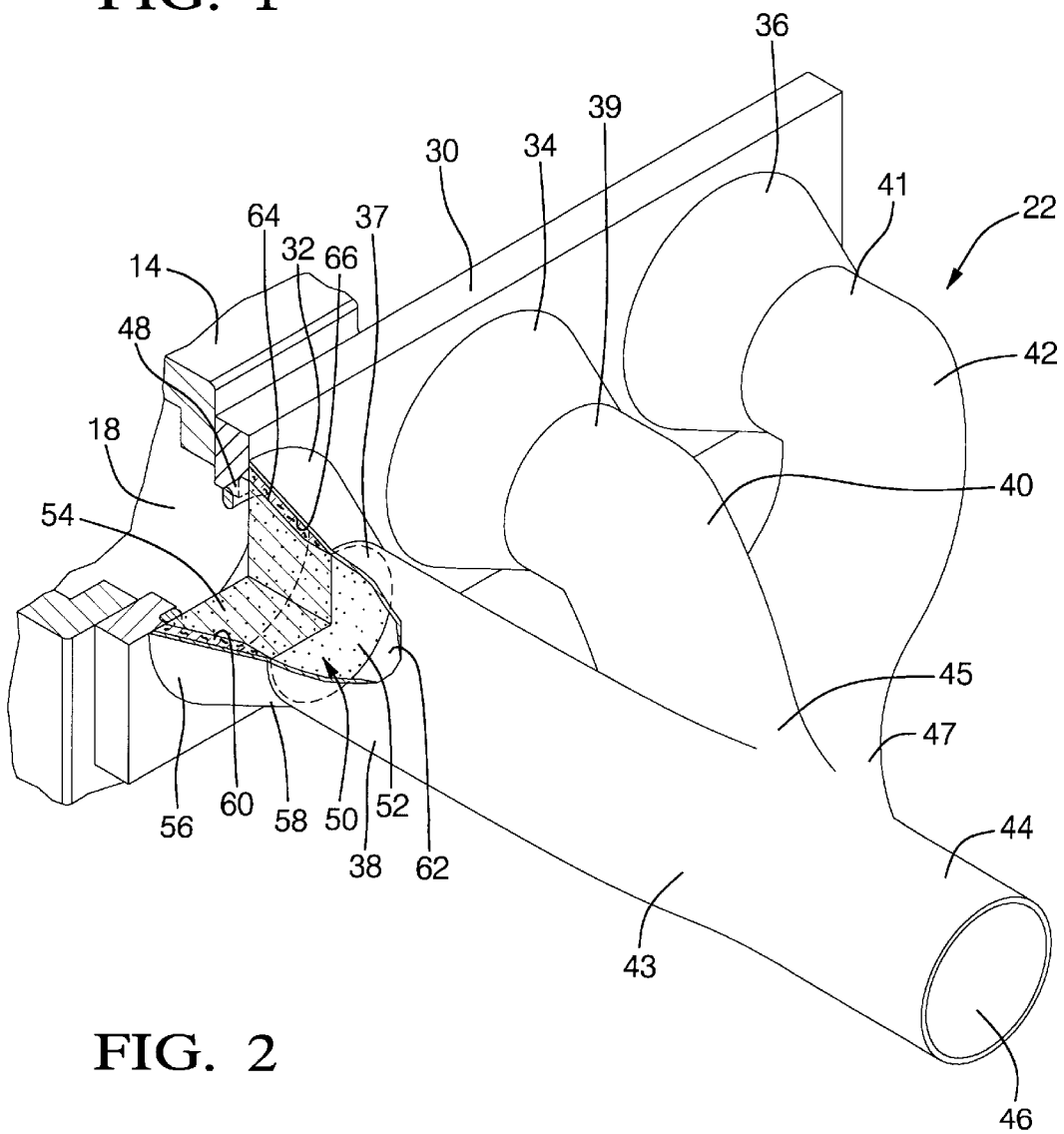
FIG. 2 illustrates a detailed view of an example manifold converter apparatus according to this invention.

Referring now to FIG. 2, a detailed example of the manifold converter apparatus 22 is shown. The manifold converter apparatus 22 includes a mounting plate 30 which mounts to the wall of the engine cylinder head 14 so that each of the inlets 32, 34 and 36 aligns with an exhaust port 18 to receive exhaust gas forced therethrough from the vehicle engine. The mounting of the plate 30 to the cylinder head wall may be according to any known method including by bolts and including use of appropriate seal material between the plate 30 and the cylinder head wall if desired. Inlet 32 is sealingly connected to first end 37 of lead pipe 38 which has its second end 43 leading into the plenum 44. The plenum 44 provides a common exhaust passage 46 that may be coupled to an exhaust system of a known type, typically including an exhaust system muffler and a tail pipe at the rear of the vehicle.

Similarly, inlet 34 is sealingly connected to end 39 of lead pipe 40 which has its second end 45 leading to the plenum 44 and inlet 36 is sealingly connected to the first end 41 of lead pipe 42 which has its second end 47 also leading to the plenum 44.

Inlet 32 will now be described in detail with the understanding that the features described with relation to inlet 32 are also included within inlets 34 and 36. Inlet 32 has a first end 56 and a second end 58 and defines between the two a generally conical shape with end 56 being the larger diameter end and end 58 being the smaller diameter end. End 56 of inlet 32 is sealingly affixed to plate 30, for example, via a circumferential weld around the complete interface between plate 30 and end 56. The smaller diameter end 58 is sealingly engaged to end 37 of lead pipe 38. The inlet 32 may be formed together with lead pipe 38 as a single unit or welded thereto if formed separately.

Reference 50 denotes a catalyst coated substrate, shown with one quarter thereof removed for illustrative purposes, located within the inlet 32 having an exterior radial periphery 64 with a generally conical shape corresponding to the interior of the inlet 32. The exterior radial periphery 64 of the substrate 50 is sized so that an annular region between the exterior radial periphery of the substrate 50 and the inner surface 66 of the inlet accommodate matting material 60 such as a compressible metal mesh or other type of matting material known for use in catalytic converters to maintain the substrate within the converter housing. The similar conical shapes of the exterior periphery 64 of substrate 50 and the interior surface 66 of inlet 32 prevent movement of the substrate 50 downstream through passage 62 through lead pipe 38. An annular gasket 48 formed, for example, of a hollow metal ring, serves as a seat preventing movement of the substrate 50 upstream through the plate 30 toward exhaust port 18 and serves to seal the flow of exhaust gases through exhaust port 18 against direct entry into the annular region occupied by matting material 60. As an alternative, when the substrate 50 is a metal substrate, it can be brazed in place to the interior surface of inlet 32.

During operation of the manifold converter apparatus shown in FIG. 2, exhaust gases exiting the vehicle engine through the exhaust ports 18 flow through each of the substrates 50 entering at the end 54 and traveling therethrough where the exhaust gas comes into contact with the catalytic converter catalyst(s) of a known type. The catalyst(s) stimulate certain reactions in the exhaust gases, for example, the oxidation of carbon monoxide to carbon dioxide, so that the exhaust gases exiting the second end 52 of the substrate 50 have a more desirable constituency for emission from the vehicle tail pipe (not shown).

In a preferred example, the substrate 50 is an open cell metal substrate, for example, of the type created by impregnating an open cell porous structure with a suspension of powdered metal, driving off the suspension medium and then sintering the metal particles together. Such open celled metal substrates provide both a porous carrier for the catalytic converter catalyst and provide a substrate with low thermal mass capable of rapidly heating within a manifold converter apparatus. The low thermal mass substrate decreasing time to light-off after cold start of the engine compared to conventional catalytic converters thereby improving exhaust management system overall performance.

Figure 3:
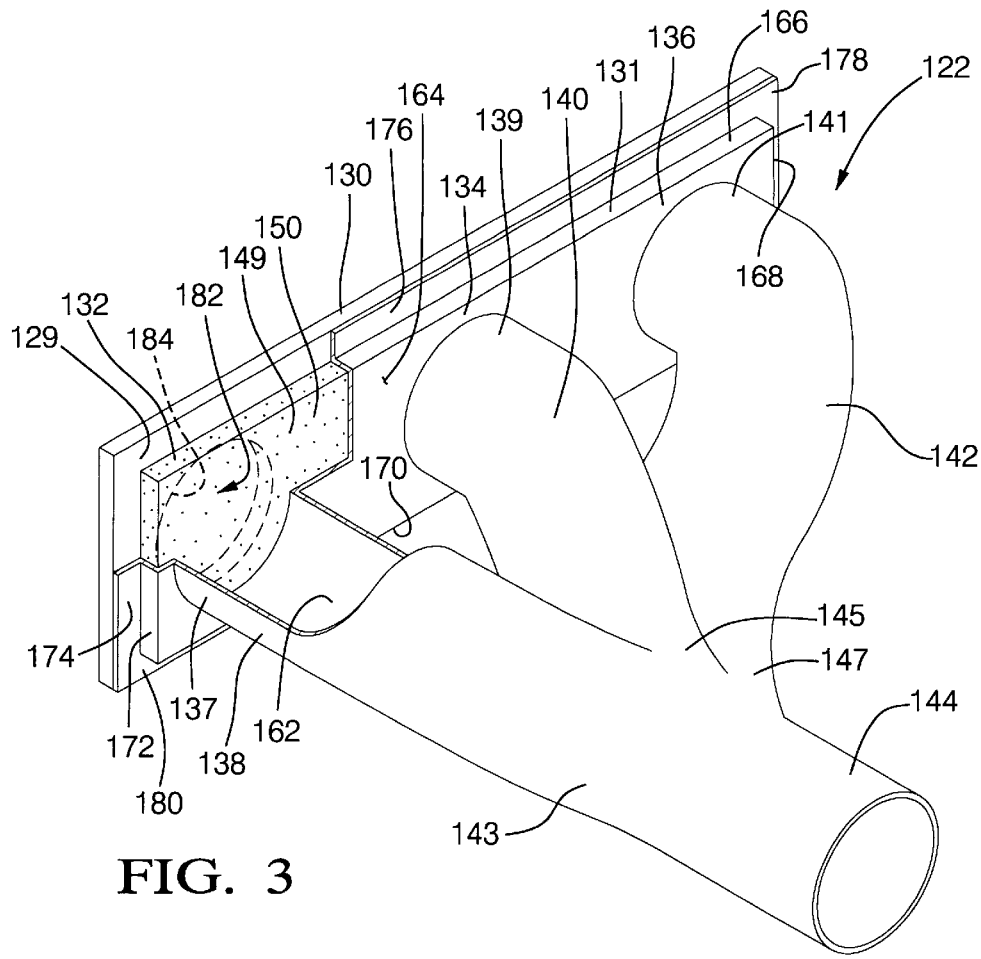
FIG. 3 illustrates a second example manifold converter apparatus according to this invention.

Referring now to FIG. 3, the example manifold converter apparatus shown includes planar mounting plate 130 shown mounted to the vehicle cylinder head (not shown) similar to the mounting of the manifold converter apparatus described above with reference to FIG. 2. Attached to the mounting plate 130 is the housing 131 having a planar wall 164 sealingly affixed to each of the ends 137, 139 and 141 of the lead pipes 138, 140 and 142. The other ends, 143, 145 and 147 of the lead pipes 138, 140 and 142, lead to the plenum 144 as shown to form a common outlet passage for the manifold converter apparatus 122. Opposing elongated side walls 166 and 170 and short end walls 172 and 168 together form a peripheral integral with the periphery of the planar wall 164 and extending perpendicular thereto to define a cavity 149. Catalyst coated substrate 150, having an elongated rectangular shape as shown, is located within the cavity 149. Planar seats 174, 176, 178 and 180 extend outwardly perpendicularly from the side and end walls 172, 166, 168 and 170, respectively, so that they are parallel to the planar surface 164. The planar seats 174, 176, 178 and 180 form seating surfaces that engage with planar surface 129 of mounting plate 130. For example, the seats 174, 176, 178 and 180 are welded to the mounting plate 130 along the entire periphery of each seat 174, 176, 178 and 180 to form a sealing engagement between the housing 131 and the mounting plate 130.

The mounting plate 130 has three openings 184 (only one shown), aligned with each exhaust port (not shown) in the cylinder head to which the manifold converter apparatus 122 is mounted and further aligned with each end 137, 139 and 141 of the lead pipes 138, 140 and 142. Using inlet 132, opening 184 and lead pipe 138 as an example and with the understanding that similar operations occur with respect to inlets 134 and 136 and lead pipes 140 and 142, the operation of the manifold converter apparatus 122 is now explained. When the vehicle engine is switched on, exhaust gases from the engine cylinders (not shown in FIG. 3), travel through the exhaust ports of the cylinder head and are forced through the opening 184 in mounting plate 130 and through the portion 182 of catalyst coated substrate 150 aligned with the opening 184 in plate 130. If the vehicle is in the cold-start operation, exhaust gases exiting from the cylinder head rapidly heat up the portion 182 of the catalyst coated substrate 150 to the light-off temperature. Once the portion 182 of the catalyst coated substrate 150 reaches light-off temperature, appropriate oxidation and/or other desirable reactions of the exhaust gases occur within the portion 182 of the substrate 150 in a manner known to those skilled in the art. The result is that gases exiting the portion 182 of substrate 150 into the flow passage 162 of lead pipe 138 has an increased content of desirable exhaust gas species and a decreased content of undesirable exhaust gas species.

In the preferable example, the substrate material for the catalyst coated substrate 150 is an open cell porous metal structure such as described above with reference to FIG. 2, wash coated with a suitable catalyst coating of a known type. It has been found that, by using an example metal substrate in the immediate proximity to the engine exhaust ports provided by the housing 131 shown in FIG. 3, the portion 182 of the substrate 150 can reach light-off temperature in less than ten seconds after engine start-up and, in some cases, in less than four seconds. This rapid light-off temperature of less than four seconds was achieved in an example engine without the use of a supplemental heating device for the catalyst coated substrate. Those skilled in the art will recognize the immediate benefit of the example manifold converter apparatus in the ability to achieve rapid light-off temperature in less than 10 seconds after cold start of the vehicle engine. This advantageous operation allows the catalyst(s) coating the substrate 150 to begin catalyzing reactions of the vehicle exhaust gases at the point light-off temperature is achieved soon after cold start of the vehicle engine.

The preferred open cell metal substrate provides various benefits over other types of substrates for the manifold converter apparatus shown. The open cell metal substrate is less likely to shatter or crack than an extruded ceramic substrate, provides better flow characteristics and surface contact in a small package than catalyst coated ceramic beads and is less sophisticated to manufacture than other metal substrates.

Figure 4:
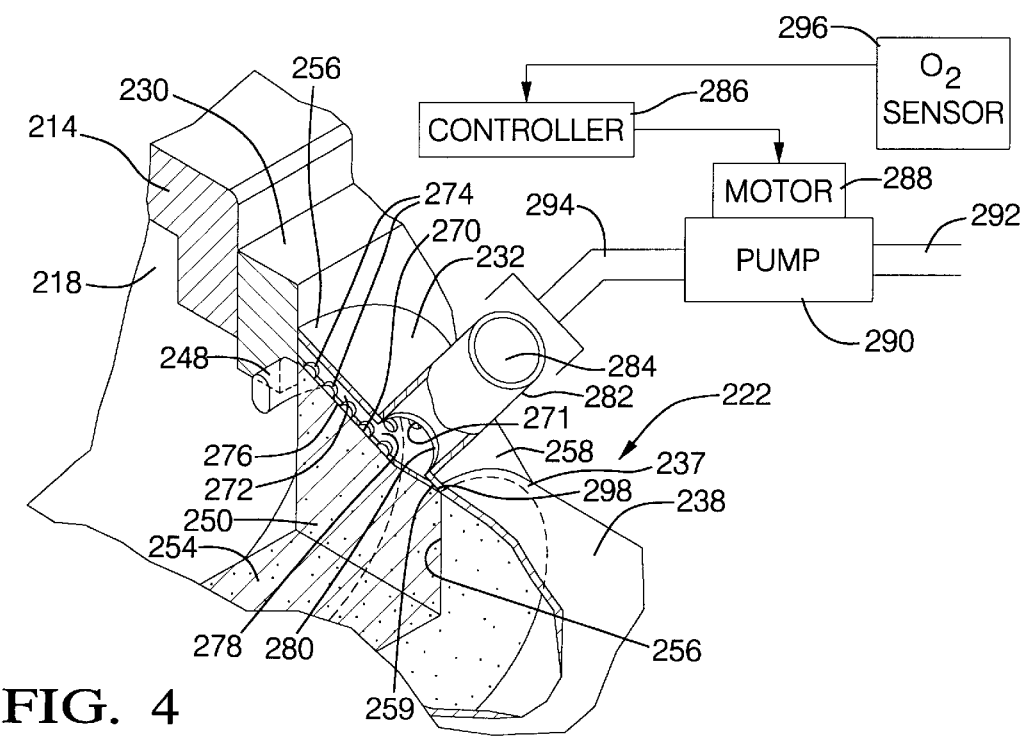
FIG. 4 illustrates yet another example manifold converter apparatus according to this invention.

Referring now to FIG. 4, the example manifold converter apparatus 222 shown is a modification of the apparatus 22 described above with reference to FIG. 2. The portion of the manifold converter apparatus 222 shown includes only one inlet 232 and one lead pipe 238, with the understanding that additional inlets and lead pipes leading to a plenum are included in a manner corresponding to that described above with reference to FIG. 2.

Inlet 232 receives exhaust gas from exhaust port 218 of the cylinder head 214 to which mounting plate 230 of manifold converter apparatus 222 is mounted in a suitable manner known to those skilled in the art. The large diameter end 256 of the inlet 232 is sealingly affixed to the mounting plate 230, for example, through a circumferential weld around the entire periphery of the end 256. The smaller diameter end 258 of the inlet 232 is sealingly engaged to the end 237 of lead pipe 238. The inlet 232 is either formed integrally with the lead pipe 238 or is welded thereto.

The catalyst coated substrate 250 receives the exhaust gases passing through the exhaust port 218 at the inlet end 254 and exposes the exhaust gases to the catalyst(s) on the catalyst coated substrate 250 while the exhaust gases pass from the inlet end 254 to the outlet end 256 and then into lead pipe 238. The radially exterior periphery 270 of the substrate 250 is spaced apart from the inner periphery 271 of the inlet 232 to thus form an annular passage 278 surrounding the catalyst coated substrate 252 between the exterior periphery 270 of the catalyst coated substrate 250 and the interior periphery 271 of the inlet 232.

In contact with the outer periphery 270 of the catalyst coated substrate 250 is a perforated support or retainer 272 having an axial end 298 engaging the inner surface 259 of the end 258 of inlet 232 to prevent movement of the perforated support 272 and catalyst coated substrate 250 toward the lead pipe 238. The perforated support 272 has an interior periphery 276 in contact with the exterior periphery 270 of the catalyst coated substrate 250 and a plurality of passages 274 extend across the perforated support 272 to allow the flow of gases from the annular passage 278 to the flow passages 274 and into the catalyst coated substrate 250. The seal 248, for example, of an annular hollow metal construction, prevents movement of the substrate 250 and perforated support 272 in the upstream direction toward exhaust port 218.

A flow pipe 282 is sealingly mounted to opening 280. Motor 288 drives pump 290 to force a flow of secondary air from inlet 292 to flow passage 294, which leads to the flow passage 284 of flow pipe 282. The secondary air thus flows through the opening 280 into the annular passage 278.

The controller 286 is a known type of microprocessor based controller that responds to various input signals including from an exhaust gas oxygen sensor 296 located downstream of the portion of the manifold converter apparatus 222 shown, for example, in the plenum of the manifold converter apparatus or further downstream from the plenum.

The controller operates using known control techniques to introduce secondary air into the annular region 278 of the inlet 232 through the opening 280. The air pumped into the annular region 278 is forced through the plurality of flow passages 274 in the substrate support 272 and into the catalyst coated substrate 250. In this example the catalyst coated substrate 250 must be capable of accepting gas flow in both the axial direction from the exhaust port 218 and in the radial direction as pumped by pump 290 into the annular chamber 274 and forced through the flow passages 274.

An open cell substrate of the type described above is preferred because the open cell structure allows both the exhaust gas to enter the catalyst coated substrate 250 in the axial direction from exhaust port 218 and the secondary air to enter the catalyst coated substrate 250 in the radial direction through flow passages 274. The combination of the axial entry of the exhaust gas and the radial entry of the secondary air into the catalyst coated substrate 250 achieves desired mixing of the secondary air and the exhaust gas within the catalyst coated substrate 250 in the presence of the catalyst(s) coated on the catalyst coated substrate 250. This desired mixing allows control in a known manner of the exhaust gas constituents exiting the vehicle. For example, when a fuel rich air/fuel mixture is provided to the engine, it is sometimes advantageous to introduce secondary air into the exhaust gases to bring the fuel/air ratio in the exhaust gases to stoichiometry. The catalyst coated substrate 250 stimulates reactions of the exhaust gas and secondary air to achieve full oxidation of hydrocarbons and carbon monoxide in the exhaust gases exiting the engine exhaust port. Many such techniques for managing engine air/fuel ratio and secondary air injection are known to those skilled in the art and detailed explanation thereof need not be set forth herein.

What is claimed is:

1. A manifold apparatus comprising:
   a manifold housing including
   (a) a plurality of inlets, wherein each inlet of the plurality of inlets is mounted immediately adjacent an internal combustion engine exhaust port;
   (b) a plurality of lead pipes, wherein each lead pipe of the plurality of lead pipes provides an exhaust gas flow passage between one of the inlets and a manifold plenum;
   (c) a planar wall sealingly affixed to each of the lead pipes at ends of the lead pipes distal from the plenum, a peripheral wall around a periphery of the planar wall, extending perpendicular to the planar wall, wherein the planar and the peripheral wall define a cavity; and
   (d) at least one catalyst coated substrate is located within the cavity and wherein the peripheral wall is in sealed engagement with the internal combustion engine.

2. A manifold apparatus according to claim 1, also comprising:
   additional catalyst coated substrates, wherein each of the plurality of inlets has located therein one of the catalyst coated substrates, wherein each of the catalyst coated substrates is located between one of the exhaust ports and one of the lead pipes.

3. A manifold apparatus according to claim 2, also comprising, within each inlet, a corresponding support with a plurality of air flow passage therethrough radially surrounding the catalyst coated substrate.

4. A manifold apparatus according to claim 3, also comprising:
   an outer wall of each inlet, wherein each outer wall is spaced away from the corresponding support to define an annular gap between the corresponding support and the outer wall.

5. A manifold apparatus according to claim 4, wherein a source of injected air is coupled to each outer wall, wherein, at each inlet, injected air flows into the annular gap, through the plurality of air flow passages through the corresponding support and into the exhaust gas flowing through the catalyst coated substrate within the inlet.

6. A manifold apparatus according to claim 1, wherein the catalyst coated substrate is further defined as an open cell metal substrate.

7. A manifold apparatus comprising:
   a manifold housing including
   a plurality of inlets, wherein each inlet of the plurality of inlets is mounted immediately adjacent an internal combustion engine exhaust port, and
   a plurality of lead pipes, wherein each lead pipe of the plurality of lead pipes provides an exhaust gas flow passage between one of the inlets and a manifold plenum;
   a plurality of conical shaped connector pipes, having a cavity therein, wherein each connector pipe sealingly affixed to each of the lead pipes at ends of the lead pipes distal from the plenum;

a planar wall sealingly affixed to each of the connector pipes, a peripheral wall around a periphery of the planar wall and extending perpendicular to the planar wall, wherein the peripheral wall is in sealed engagement with the internal combustion engine; and at least one catalyst coated substrate is located within each cavity of the plurality of connector pipes.

8. A manifold apparatus according to claim 7, also comprising, within each inlet, a corresponding support with a plurality of air flow passage therethrough radially surrounding the catalyst coated substrate.

9. A manifold apparatus according to claim 8, also comprising:

an outer wall of each inlet, wherein each outer wall is spaced away from the corresponding support to define an annular gap between the corresponding support and the outer wall.

10. A manifold apparatus according to claim 9, wherein a source of injected air is coupled to each outer wall, wherein, at each inlet, injected air flows into the annular gap, through the plurality of air flow passages through the corresponding support and into the exhaust gas flowing through the catalyst coated substrate within the inlet.

11. A manifold apparatus according to claim 7, wherein the catalyst coated substrate is further defined as an open cell metal substrate.

* * * * *